United States Patent
Sambo et al.

(10) Patent No.: US 9,100,730 B2
(45) Date of Patent: Aug. 4, 2015

(54) ESTABLISHING CONNECTIONS IN A MULTI-RATE OPTICAL NETWORK

(75) Inventors: Nicola Sambo, Leghorn (IT); Giulio Bottari, Leghorn (IT); Piero Castoldi, Vicopisano (IT); Filippo Cugini, Fidenza (IT); Paola Iovanna, Rome (IT)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 210 days.

(21) Appl. No.: 13/825,017

(22) PCT Filed: Oct. 15, 2010

(86) PCT No.: PCT/EP2010/065559
§ 371 (c)(1),
(2), (4) Date: Oct. 10, 2013

(87) PCT Pub. No.: WO2012/034603
PCT Pub. Date: Mar. 22, 2012

(65) Prior Publication Data
US 2014/0023364 A1    Jan. 23, 2014

(30) Foreign Application Priority Data
Sep. 15, 2010  (EP) .................................. 10176796

(51) Int. Cl.
*H04J 14/00*    (2006.01)
*H04Q 11/00*    (2006.01)
*H04J 14/02*    (2006.01)

(52) U.S. Cl.
CPC .......... *H04Q 11/0062* (2013.01); *H04J 14/026* (2013.01); *H04J 14/0257* (2013.01);
(Continued)

(58) Field of Classification Search
CPC .......... H04Q 11/0001; H04Q 11/0066; H04Q 11/0062; H04Q 11/0037; H04Q 2011/0047; H04Q 2011/0086; H04Q 2011/0077; H04Q 2011/0088; H04J 14/0224; H04J 14/0227; H04J 14/0238; H04J 14/0232; H04J 14/0234; H04J 14/0235; H04J 14/0236; H04J 14/0239; H04J 14/0241; H04J 14/0245; H04J 14/0249; H04J 14/0257; H04J 14/0258; H04J 14/026; H04J 14/0269; H04J 14/0253; H04J 14/0267
USPC .................................... 398/25, 45, 49, 50, 58
See application file for complete search history.

(56) References Cited

U.S. PATENT DOCUMENTS

2004/0052528 A1* 3/2004 Halgren et al. .................. 398/75
2004/0208560 A1* 10/2004 Gumaste et al. ................ 398/59
(Continued)

OTHER PUBLICATIONS
D. Schroetter et al., "OSPF Link Information Model for OSPF; draft-schroetter-wson-ospf-link-info-00," Mar. 1, 2010, 20 pages, Internet Engineering Task Force, Internet-Draft, The IETF Trust.
(Continued)

*Primary Examiner* — Dalzid Singh
(74) *Attorney, Agent, or Firm* — Nicholson De Vos; Webster & Elliott, LLP (57) ABSTRACT

An optical transmission network comprises nodes which support a plurality of different wavelength channels and support at least a first bitrate traffic type and the second bitrate traffic type on respective wavelength channels. A connection of the second bitrate traffic type is established on an available wavelength, if the wavelength offers an acceptable quality of transmission using a first quality of transmission calculation. Alternatively, a connection of the second bitrate traffic type is established on a wavelength which is spaced, by a guard band, from wavelengths used for connections of the first bitrate traffic type, if the wavelength offers an acceptable quality of transmission using a second quality of transmission calculation. The second quality of transmission calculation is less stringent than the first quality of transmission calculation, and can ignore the effects of interference due to cross-phase modulation. The guard band is a wavelength spacing at which the interference between a connection of the first bitrate traffic type and a connection of the second bitrate traffic type is less than a predetermined amount.

16 Claims, 8 Drawing Sheets

(52) U.S. Cl.
CPC ......... *H04J14/0258* (2013.01); *H04J 14/0267* (2013.01); *H04J 14/0269* (2013.01); *H04Q 2011/0077* (2013.01); *H04Q 2011/0088* (2013.01)

(56) References Cited

U.S. PATENT DOCUMENTS

| | | | | |
|---|---|---|---|---|
| 2005/0089027 A1* | 4/2005 | Colton | | 370/380 |
| 2009/0190497 A1* | 7/2009 | Peloso et al. | | 370/254 |
| 2011/0081148 A1* | 4/2011 | Lee et al. | | 398/48 |

OTHER PUBLICATIONS

N. Andriolli et al., "Label Preference Schemes in GMPLS Controlled Networks," Dec. 2006, 3 pages, IEEE Communications Letters, vol. 10, No. 12, IEEE.

Yixuan Qin et al., "Hardware Accelerated Impairment Aware Control Plane," Mar. 21, 2010, 3 pages, IEEE.

Indra Widjaja et al., "Study of GMPLS Lightpath Setup Over Lambda-Router Networks," 2002, 5 pages, IEEE.

Ioannis Tomkos et al., "New Challenges in Next-Generation Optical Network Planning," Jun. 27, 2010, 4 pages, ICTON 2010, IEEE.

Greg Bernstein et al., "Routing and Wavelength Assignment Information for Wavelength Switched Optical Networks, draft-bernstein-ccamp-wson-info-02.txt," Feb. 20, 2008, 24 pages, Network Working Group, Internet Draft, The IETF Trust.

International Search Report, Application No. PCT/EP2010/065559, dated Jun. 7, 2011, 3 pages.

Keang-Po Ho, "Error Probability of DPSK Signals With Cross-Phase Modulation Induced Nonlinear Phase Noise," Mar./Apr. 2004, 7 pages, IEEE Journal of Selected Topics in Quantum Electronics, vol. 10, No. 2.

"40G Modelling," Jan. 16, 2006, 50 pages.

\* cited by examiner

ESTABLISHING CONNECTIONS IN A MULTI-RATE OPTICAL NETWORK

CROSS-REFERENCE TO RELATED APPLICATIONS

This application is a National stage of International Application No. PCT/EP2010/065559, filed Oct. 15, 2010, which claims priority to EP Application No. 10176796.0, filed Sep. 15, 2010, which are hereby incorporated by reference.

TECHNICAL FIELD

This invention relates to optical transmission networks, and to set-up of connections in such a network.

BACKGROUND

Optical transmission networks allow all-optical transmission between network nodes. Traffic is carried by optical wavelength channels, called lambdas, and optical switching technology, such as Wavelength Selective Switches (WSS), allow lambdas to be switched at nodes.

A control plane can be added to this kind of network to allow automated set-up of paths, tear-down of paths and traffic recovery when faults occur in the network. A possible control plane is the Generalized Multi Protocol Label Switching (GMPLS) protocol suite being developed by the Internet Engineering Task Force (IETF). The GMPLS application for optical networks is called Wavelength Switched Optical Network (WSON).

There are now a range of different transmission technologies available for connections within an optical transmission network. Connections can operate at 10 Gbit/s, 40 Gbit/s or 100 Gbit/s and there is a range of different modulation formats, such as On-Off Keying (OOK) and various phase modulation formats, which will generally be called xPSK. Connections operating at different bit-rates and modulation formats can co-exist in the same wavelength switched optical networks (WSONs). In such a multi bit rate WSON, cross-phase modulation (XPM) can be detrimental, especially when it is induced by an OOK signal on an xPSK signal at a higher bit-rate.

A current way of establishing a connection within an optical transmission network estimates a Quality of Transmission (QoT) for the proposed connection and considers a worst-case penalty for the effects of cross-phase modulation. A value of QoT that is acceptable in the worst-case scenario (i.e. when the central wavelength is occupied by a 100 Gbit/s xPSK signal and all other wavelengths by 10 Gbit/s OOK signals) assures the preservation of the lightpath when other new lightpaths are established.

A disadvantage of the current approach is that it can result in many new connections being refused because the Quality of Transmission is unacceptable under worst-case transmission conditions.

SUMMARY

A first aspect of the invention provides a method of establishing a connection of a second bitrate traffic type in an optical transmission network. The network comprises nodes connected by optical links. The nodes support a plurality of different wavelength channels on the links and support at least a first bitrate traffic type and the second bitrate traffic type on respective wavelength channels. The method comprises, at one of the nodes, receiving first information identifying wavelengths which are available on an upstream path to the node. The method further comprises receiving second information identifying wavelengths which are available on an upstream path to the node and which are spaced, by a guard band, from wavelengths used for connections of the first bitrate traffic type. The guard band is a wavelength spacing at which the interference between a connection of the first bitrate traffic type and a connection of the second bitrate traffic type is less than a predetermined amount. The method further comprises determining a quality of transmission of a wavelength in the first information using a first quality of transmission calculation. If a result of the first quality of transmission calculation is not acceptable, the method determines a quality of transmission of an available wavelength in the second information using a second quality of transmission calculation. The second quality of transmission calculation is less stringent than the first quality of transmission calculation.

Advantageously, the first bitrate traffic type is on-off key (OOK) modulated traffic at a first bitrate, such as 10G OOK traffic, and the second bitrate traffic type is phase modulated (xPSK) traffic at a second bitrate, higher than the first bitrate, such as 100G xPSK traffic.

The above method can be performed at a destination node of a connection, or at an intermediate node along a path of the connection.

An advantage of the method is that a connection can be established in a multi-rate optical transmission network even when the first Quality of Transmission (QoT) calculation (e.g. a QoT calculation assuming "worst-case" transmission conditions) would reject the connection. A connection which does not offer an acceptable result for the first QoT calculation can still be used for a connection, and "guarded", thereby preventing other connections from occupying wavelengths within a "guard band" each side of the wavelength used for the connection. These other connections can be of the type which cause the effects assumed when making the first QoT calculation, such as cross-phase modulation (XPM) between a lower bitrate traffic type (e.g. 10 Gbit/s OOK traffic) and a higher bitrate traffic type (e.g. 40G or 100G xPSK traffic).

Advantageously, if a result of the second quality of transmission calculation is satisfactory, the method further comprises signalling to nodes to select that wavelength for the connection.

Advantageously, if a result of the second quality of transmission calculation is satisfactory, the method further comprises signalling to nodes to designate the wavelength which gave the satisfactory result as a guarded wavelength.

Another aspect of the invention provides a method of establishing a connection of a second bitrate traffic type in an optical transmission network. The network comprises nodes connected by optical links. Nodes support a plurality of different wavelength channels on the links and support at least a first bitrate traffic type and the second bitrate traffic type on respective wavelength channels. An in-use wavelength can be guarded or unguarded. The method comprises, at one of the nodes, determining available wavelengths on a downstream link from the node. The method further comprises determining available wavelengths on a downstream link from the node which are spaced, by a guard band, from wavelengths used for connections of the first bitrate traffic type. The guard band is a wavelength spacing at which the interference between a connection of the first traffic type and a connection of the second traffic type is less than a predetermined amount. The method further comprises advertising the determined wavelengths to a downstream node.

Advantageously, the first bitrate traffic type is on-off key (OOK) modulated traffic at a first bitrate, such as 10G OOK traffic, and the second bitrate traffic type is phase modulated (xPSK) traffic at a second bitrate, higher than the first bitrate, such as 100G xPSK traffic.

Another aspect of the invention provides a method of establishing a connection of a first bitrate traffic type in an optical transmission network. The network comprises nodes connected by optical links. The nodes support a plurality of different wavelength channels on the links and support at least a first traffic type and the second traffic type on respective wavelength channels. The method comprises, at one of the nodes, receiving information identifying wavelengths which are available on an upstream path to the node and which are spaced, by a guard band, from guarded in-use wavelengths used for a connection of the second bitrate traffic type. The guard band is a wavelength spacing at which the interference between a connection of the first traffic type and a connection of the second traffic type is less than a predetermined amount. The method further comprises determining a quality of transmission of a wavelength in the received information.

Advantageously, the first bitrate traffic type is on-off key (OOK) modulated traffic at a first bitrate, such as 10G OOK traffic, and the second bitrate traffic type is phase modulated (xPSK) traffic at a second bitrate, higher than the first bitrate, such as 100G xPSK traffic.

The above method can be performed at a destination node of a connection, or at an intermediate node along a path of the connection.

Another aspect of the invention provides a method of establishing a connection of a first bitrate traffic type in an optical transmission network. The network comprises nodes connected by optical links. The nodes support a plurality of different wavelength channels on the links and support at least the first traffic type and a second traffic type. An in-use wavelength can be guarded or unguarded. The method comprises, at one of the nodes, determining available wavelengths on a downstream link from the node which are spaced, by a guard band, from guarded in-use wavelengths used for connections of the second bitrate traffic type. The guard band is a wavelength spacing at which the interference between a connection of the first traffic type and a connection of the second traffic type is less than a predetermined amount. The method further comprises advertising the determined wavelengths to a downstream node.

An advantage of this method is that the node does not advertise wavelengths which will interfere with guarded wavelengths to downstream nodes, thereby preventing downstream nodes from using the determined wavelengths.

Advantageously, the first bitrate traffic type is on-off key (OOK) modulated traffic at a first bitrate, such as 10G OOK traffic, and the second bitrate traffic type is phase modulated (xPSK) traffic at a second bitrate, higher than the first bitrate, such as 100G xPSK traffic.

In each of the aspects above the first bitrate traffic type and the second bitrate traffic type can have the same bitrate, but different modulation formats, such as 10G OOK modulated traffic and 10G xPSK modulated traffic, although it is currently unusual for these different modulation schemes to be used at the same bitrate.

The functionality described here can be implemented in hardware, software executed by a processing apparatus, or by a combination of hardware and software. The processing apparatus can comprise a computer, a processor, a state machine, a logic array or any other suitable processing apparatus. The processing apparatus can be a general-purpose processor which executes software to cause the general-purpose processor to perform the required tasks, or the processing apparatus can be dedicated to perform the required functions. Another aspect of the invention provides machine-readable instructions (software) which, when executed by a processor, perform any of the described methods. The machine-readable instructions may be stored on an electronic memory device, hard disk, optical disk or other machine-readable storage medium. The machine-readable instructions can be downloaded to the storage medium via a network connection.

BRIEF DESCRIPTION OF THE DRAWINGS

Embodiments of the invention will be described, by way of example only, with reference to the accompanying drawings in which.

DETAILED DESCRIPTION

Figure 1:
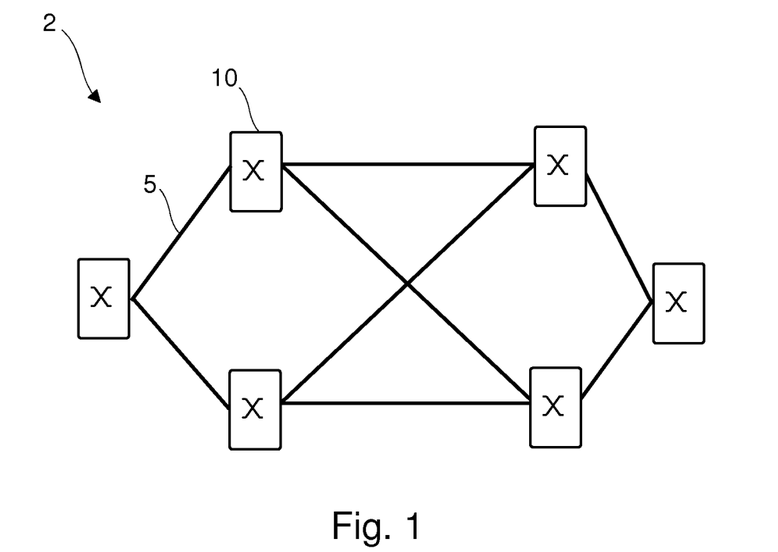
FIG. 1 shows an optical transmission network.

FIG. 1 shows an optical transmission network 2 with nodes 10. Optical transmission links 5 connect nodes 10. Traffic is carried on links 5 by wavelength channels, called lambdas. Each node has an optical transceiver for optically transmitting traffic on lambdas and for optically receiving traffic on lambdas. A node 10 which connects to multiple links 5 comprises a wavelength selective-switch which is arranged to forward traffic based on a wavelength of the lambda. At a node, traffic received on a lambda on an ingress link is selectively forwarded to an egress link. A node in an optical network is typically called a Reconfigurable Optical Add Drop Multiplexer (ROADM).

Embodiments of the invention generally apply to any situation where there is a need to set-up or tear-down a connection or lightpath. The terms "connection" and "lightpath" will be used interchangeably.

Figure 2:
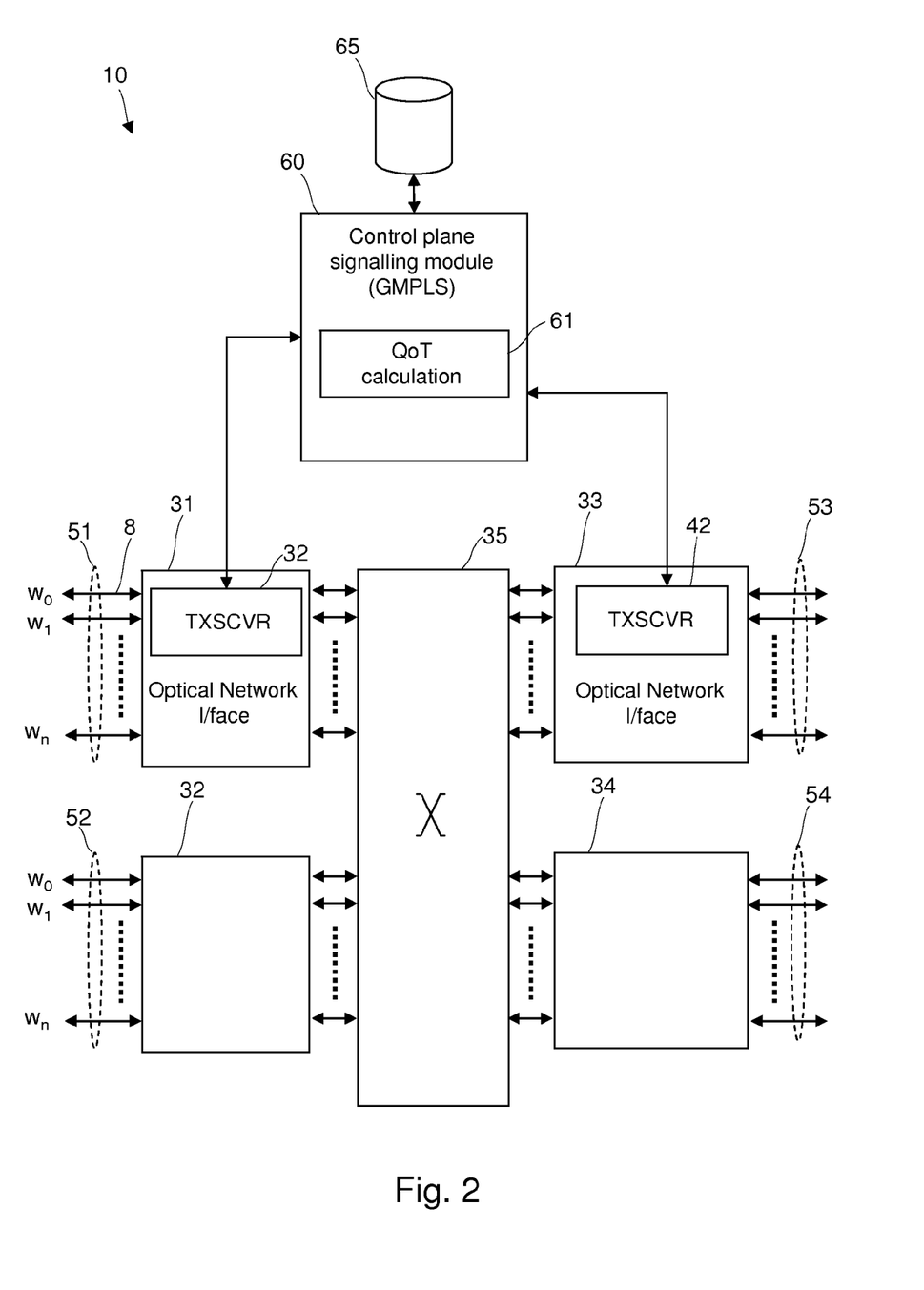
FIG. 2 shows a node in the network of FIG. 1 in more detail.

FIG. 2 shows one of the nodes 10 in the optical transmission network 2 of FIG. 1. Node 10 connects to optical links 51-54. Each link can support a set of lambdas, shown as $w_0$-$w_n$. Each link 51-54 connects to a respective optical interface 31-34. A wavelength selective-switch 35 connects to the optical interface 30 of each link 5. FIG. 2 shows node 10 connecting to four links 51-54, but it will be appreciated that the node 10 can connect to a smaller, or greater, number of links. The number of wavelength channels $w_0$-$w_n$ supported by each of the links 51-54 does not have to be equal. Bi-directional operation is supported by separate lambdas for forward and reverse direction, and advantageously separate links 5 are used for each direction. A wavelength selective switch (WSS) 35 connects to the optical interfaces 31-34. Each optical interface includes at least one transceiver 32 for transmitting and receiving traffic on lambdas.

Each node 10 supports transmission and reception at multiple bitrates, such as 10 Gbit/s and 100 Gbit/s. Other possible bitrates are 2.5 Gbit/s and 40 Gbit/s. Future systems may use higher bitrates. Each node can support a range of modulation formats, such as On-Off Keying (OOK) and at least one phase modulation format. Phase modulation formats will generally be called xPSK. Possible phase modulation formats include: Differential Quadrature Phase Shift Keying (DQPSK), Dual Polarisation Quadrature Phase Shift Keying (DP-QPSK) and Quadrature Amplitude Modulation.

One way of establishing a connection in the network 2 is by using a distributed control plane. Node 10 has a control plane signalling module 60 for participating in control plane signalling between nodes 10. A memory 65 stores data used by the control plane signalling module 60. Module 60 can comprise a collection of sub-modules which perform separate functions. FIG. 2 shows a module 61 for calculating Quality of Transmission (QoT) of a connection.

Signalling occurs between nodes 10 using a control plane technology such as Generalized Multi Protocol Label Switching (GMPLS). Signalling messages carry information which allows nodes 10 to indicate which wavelengths are available on links 5 between nodes 10 along the proposed lightpath and allows nodes to calculate a Quality of Transmission (QoT) metric for a proposed lightpath. This allows a node 10 to determine if a proposed lightpath will meet a required quality threshold. The signalling messages can be Resource Reservation Protocol-Traffic Engineering (RSVP-TE) messages. RFC 3473 defines a Label Set (LS) for collecting wavelength availability information.

As nodes 10 support a range of different bitrates and modulation formats, there can be situations where signals of different bitrate and/or different modulation format travel along the same link 5, i.e. co-propagate. A form of interference, called cross-phase modulation (XPM), can be induced by one connection on another connection. Cross-phase modulation is tolerable under any one of the following conditions: when induced among connections at the same bit rate; when induced on connections using an OOK modulation format by connections using an xPSK modulation format; and when induced on connections using an xPSK modulation format by connections using an xPSK modulation format. Cross-phase modulation is problematic when induced by a lower bitrate OOK connection on an xPSK connection at a higher bit-rate, such as a 10G OOK connection on a 100G connection, a 10G OOK connection on a 40G connection, a 2.5G OOK connection on a 40G or 100G connection. Connections can follow different routes across the network 2, and therefore the co-propagation can last for only one hop between nodes, or a larger number of hops.

At a destination node of a proposed connection, a signalling module 60 computes a Quality of Transmission (QoT) of a possible path across the network 2 using a particular wavelength. Typically, the calculation is for a worst-case scenario, where adjacent wavelengths carry connections which use interfering modulation formats at different bitrates.

Figure 3:
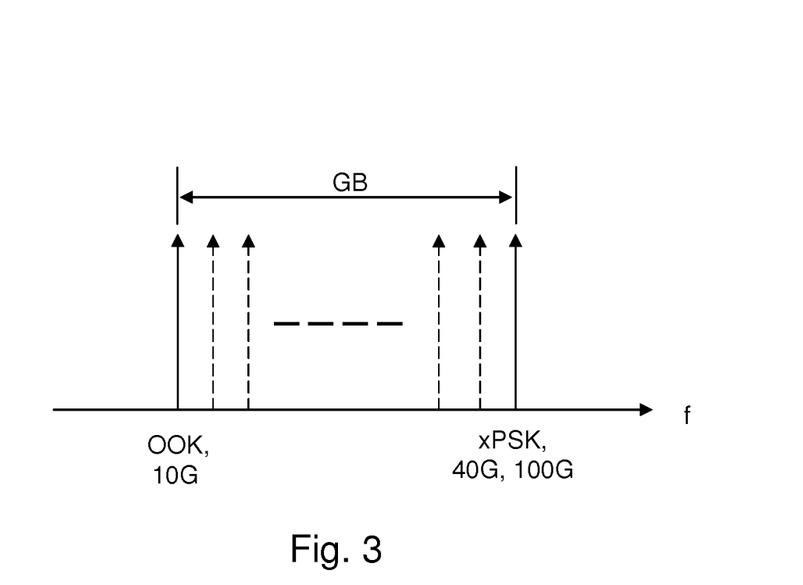
FIG. 3 shows a guard band between wavelengths.

In embodiments of the invention, a guard band can be provided between a lower bitrate connection and a higher bitrate connection. FIG. 3 shows a guard band between a lower bitrate OOK connection and a higher bitrate xPSK connection. The Guard band (GB) is defined as the number of free wavelengths between a 100 Gbit/s connection and a 10 Gbit/s connection for which XPM effects are negligible on Bit Error Rate (BER), or within some acceptable threshold value, selected by the operator. The Appendix gives an example of how to compute BER in the Appendix. A higher bitrate connection is called guarded if it must be separated by at least the guard band GB from all lower bitrate OOK connections. A higher bitrate connection is called unguarded if it can be established without the need for a guard band GB between that connection and lower bitrate OOK connections. The higher bitrate can be 100 Gbit/s and the lower bitrate can be 10 Gbit/s.

Embodiments of the invention use a Secondary Label Set (SLS), in addition to the existing label set, when signalling between nodes 10. The SLS can be carried as an object within GMPLS signalling messages, such as an extension to an RSVP-TE message, and can have the same structure as a LS. The SLS can be carried within the same message as the LS, or a separate message. LS is used in a method according to an embodiment of the invention to gather wavelength availability information to set up 10 Gbit/s lightpaths and 100 Gbit/s lightpaths such that 100 Gbit/s lightpaths have acceptable QoT in the worst-case scenario. SLS is used in a method according to an embodiment of the invention to gather wavelength availability information to set up 100 Gbit/s lightpaths under conditions where there is a guard band separating interfering lightpaths. Set up of connections of different bitrates will now be described.

10G Lightpath Set-Up

Figure 4:
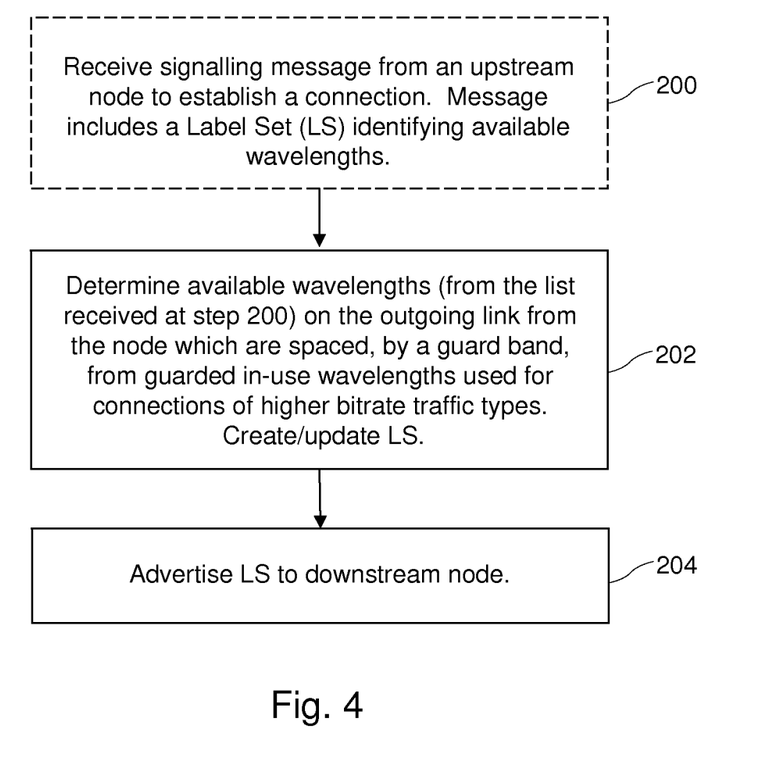
FIG. 4 shows a method performed at a source or intermediate node to establish a connection at a lower bitrate.

FIG. 4 shows a method performed at a source node (steps 202, 204) of a proposed connection and at any intermediate nodes (steps 200, 202, 204) along the path of the proposed connection. Step 200 only applies to intermediate nodes. At step 200 the node receives a control plane signalling message which carries information about available wavelengths on the upstream path to the node. The information can be carried as a GMPLS Label Set (LS). No Secondary Label Set (SLS) objects are required to establish a 10G lightpath. The signalling message can be an RSVP-TE Path message.

At step 202 the node determines available wavelengths on the outgoing link from the node. A wavelength is considered available if it is not yet in use by an existing connection and if it is spaced, by more than a guard band GB, from a guarded in-use wavelength used for a connection of a higher bitrate traffic type (e.g. 100 Gbit/s). For a source node, the node creates a LS carrying the set of available wavelengths. For an intermediate node, the node receives, at step 200, a LS identifying a set of available wavelengths on the upstream path. The node updates the set of wavelengths received in the LS received at step 200. The node removes any wavelengths listed in the received LS which are not available on the outgoing link. Stated another way, the intermediate node determines if the wavelengths listed in the received LS are available on the outgoing link, and updates the LS. At step 204 the node sends the Path message to the downstream node along the path.

Figure 5:
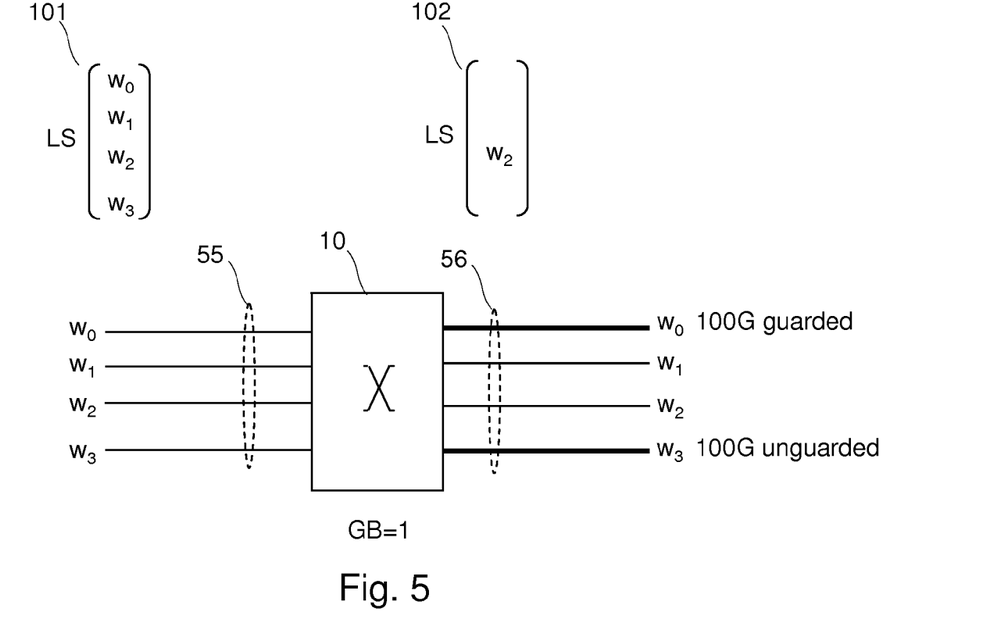
FIG. 5 shows label sets at an intermediate node.

FIG. 5 shows the use of LS at an intermediate node 10 during the set-up of a 10G lightpath. A LS 101 is received at the intermediate node 10. LS 101 advertises the wavelengths that are available in the upstream path. The node performs the method described above to determine a LS 102 that can be advertised to downstream nodes along the path of the proposed connection. On the outgoing link 56, wavelengths $w_0$ and $w_3$ are already in use: $w_0$ is being used to carry a 100G guarded lightpath and $w_3$ is being used to carry a 100G unguarded lightpath. These wavelengths are removed from the set of possible wavelengths that can be used on the outgoing link 56. On the outgoing link 56, wavelength $w_0$ is a guarded 100G wavelength, with a guard band GB value=1. Therefore, wavelength $w_1$ is also removed from the set of possible wavelengths that can be used on the outgoing link 56. Label Set LS 102 has one entry: $w_2$. Label Set LS 102 is advertised to nodes 10 located downstream along the path of the proposed connection.

Figure 6:
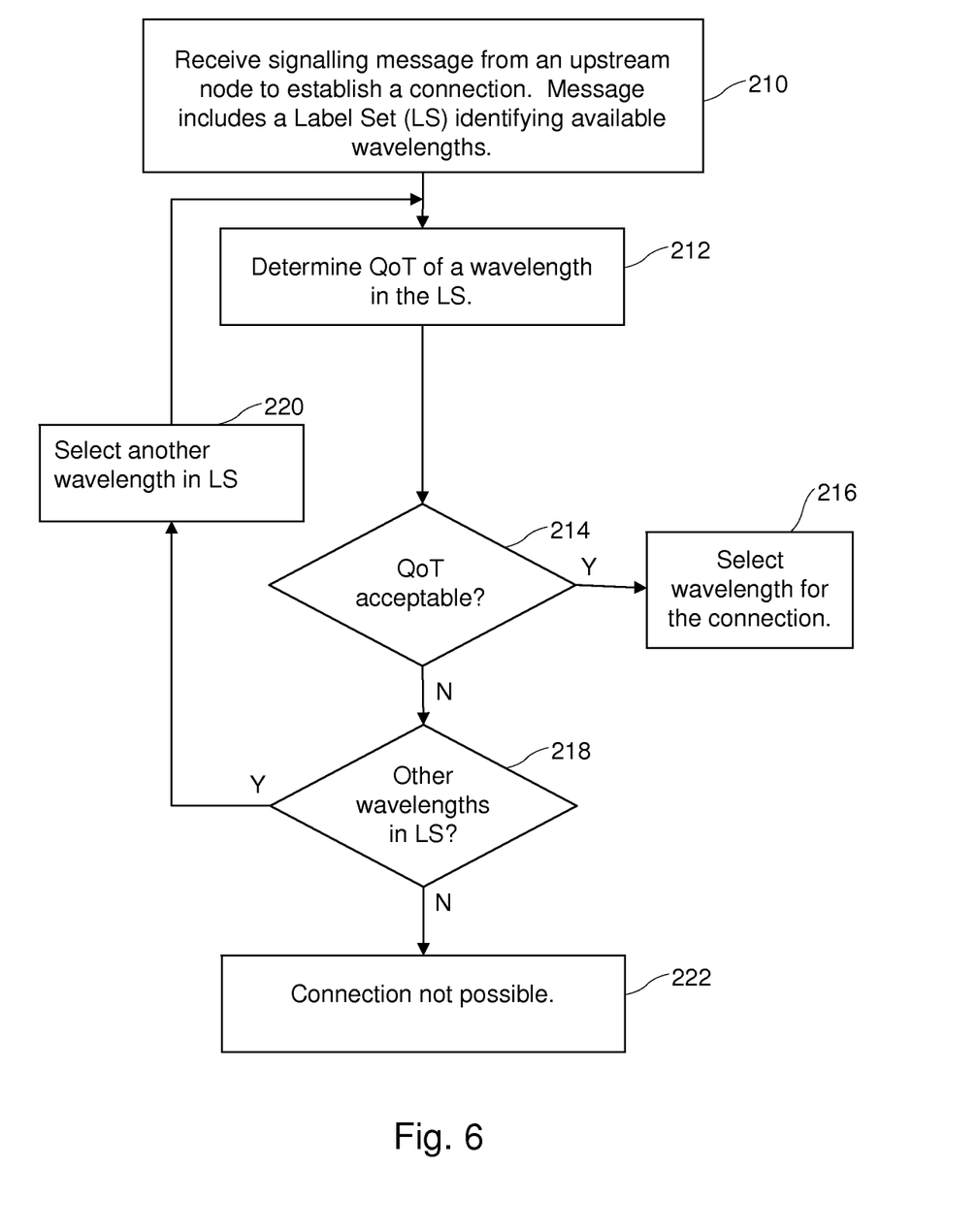
FIG. 6 shows a method performed at a node to calculate a quality of transmission (QoT)

FIG. 6 shows a method performed at a destination node of a proposed connection. At step 210 the destination node receives a signalling message from an upstream node along the path of the proposed connection. The message includes a Label Set (LS) identifying available wavelengths. At step 212 the destination node calculates QoT at one of the wavelengths advertised in LS, assuming worst-case conditions. Step 214 determines if the QoT meets a threshold representing an acceptable QoT. If the QoT is acceptable, the method selects that wavelength for the connection at step 216. If the QoT is not acceptable, the method proceeds to step 220 and selects another of the wavelengths advertised in the LS and returns to step 212. The calculation of QoT can use any suitable algorithm. If none of the wavelengths advertised in the LS offers an acceptable QoT (steps 214, 218), the method exits at step 222 and a connection cannot be set up. The method performed at upstream nodes ensures that any of the set of wavelengths carried in the LS, as received at the destination node, will cause an acceptable level of interference to 100G lightpaths.

100G Lightpath Set-Up

Figure 7:
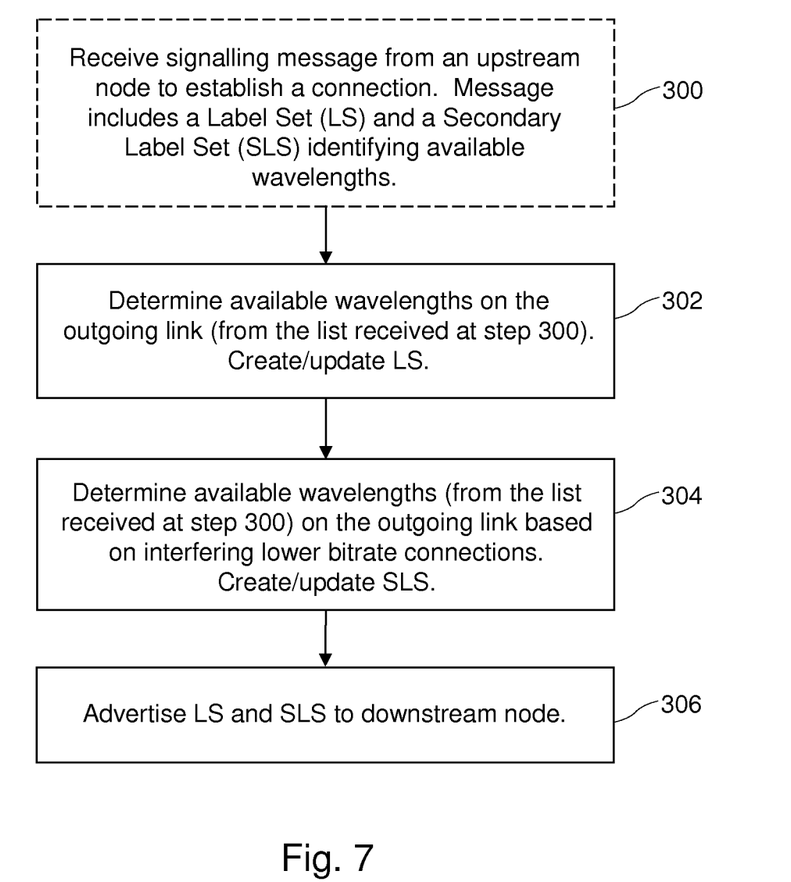
FIG. 7 shows a method performed at a source or intermediate node to establish a connection at a higher bitrate.

FIG. 7 shows a method performed at a source node (steps 302-306) of a proposed connection and at any intermediate nodes (steps 300-306) along the path of the proposed connection. Step 300 only applies to intermediate nodes. The node receives a control plane signalling message which carries information about available wavelengths on the upstream path. Both Label Set (LS) and Secondary Label Set (SLS) objects are carried in the signalling message used to establish a lightpath.

At step 302 the node determines available wavelengths on the outgoing link. A wavelength is considered available if it is not yet in use by an existing connection. For a source node, the node creates a LS carrying the set of available wavelengths. For an intermediate node, the node updates the set of wavelengths received in the LS received at step 300. Stated another way, the intermediate node determines if the wavelengths listed in the received LS are available on the outgoing link, and updates the LS. At step 306 the node sends the Path message to the downstream node. Step 304 determines available wavelengths on the outgoing link based on lower bitrate interfering connections. A wavelength is considered available if it is not yet in use by an existing connection and if it is spaced, by more than a guard band GB, from a wavelength used for an existing connection of a lower bitrate interfering traffic type (e.g. 10 Gbit/s OOK traffic).

Figure 8:
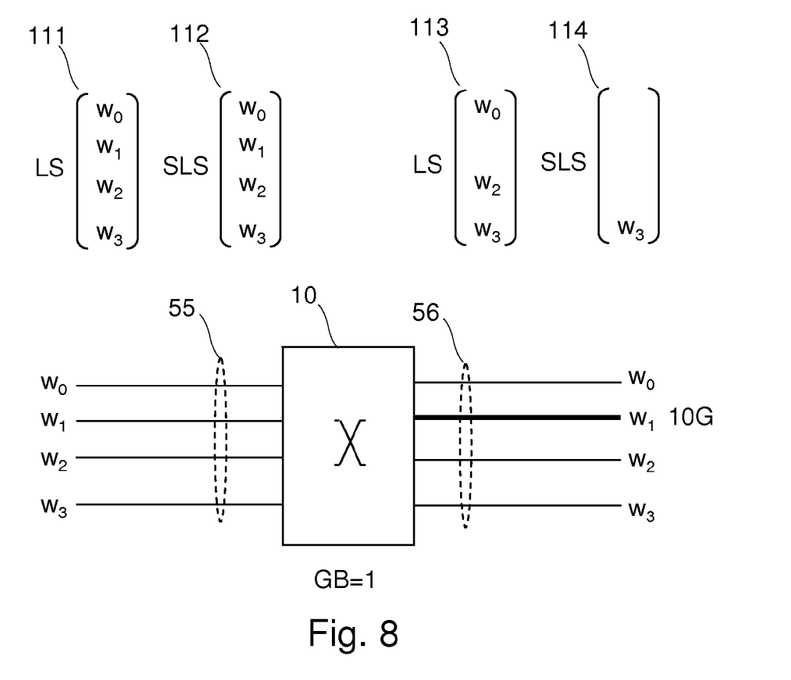
FIG. 8 shows label sets at an intermediate node.

FIG. 8 shows the use of LS and SLS at an intermediate node 10 during the set-up of a 100G lightpath. A LS 111 and a SLS 112 are received at the intermediate node 10. LS 111 advertises the wavelengths that are available in the upstream path, calculated under worst-case QoT conditions. SLS 112 advertises the wavelengths that are available in the upstream path, which can be used with a less stringent QoT threshold, as they are suitably separated from interfering lightpaths. The node performs the method described above to determine a LS 113 and a SLS 114 that can be advertised to downstream nodes along the path of the proposed connection. On the outgoing link 56, wavelength $w_1$ is already in use. Firstly, wavelength $w_1$ is removed from both LS 113 and SLS 114. Next, the method considers 10G lightpaths that could interfere. With a guard band GB=1, wavelengths $w_0$ and $w_2$ are removed from SLS 114. Label Set LS 113 has three entries: $w_0$, $w_2$, $w_3$ and Label Set SLS 114 has one entry: $w_3$. LS 113 and SLS 114 are advertised to nodes 10 located downstream along the path of the proposed connection.

Figure 9:
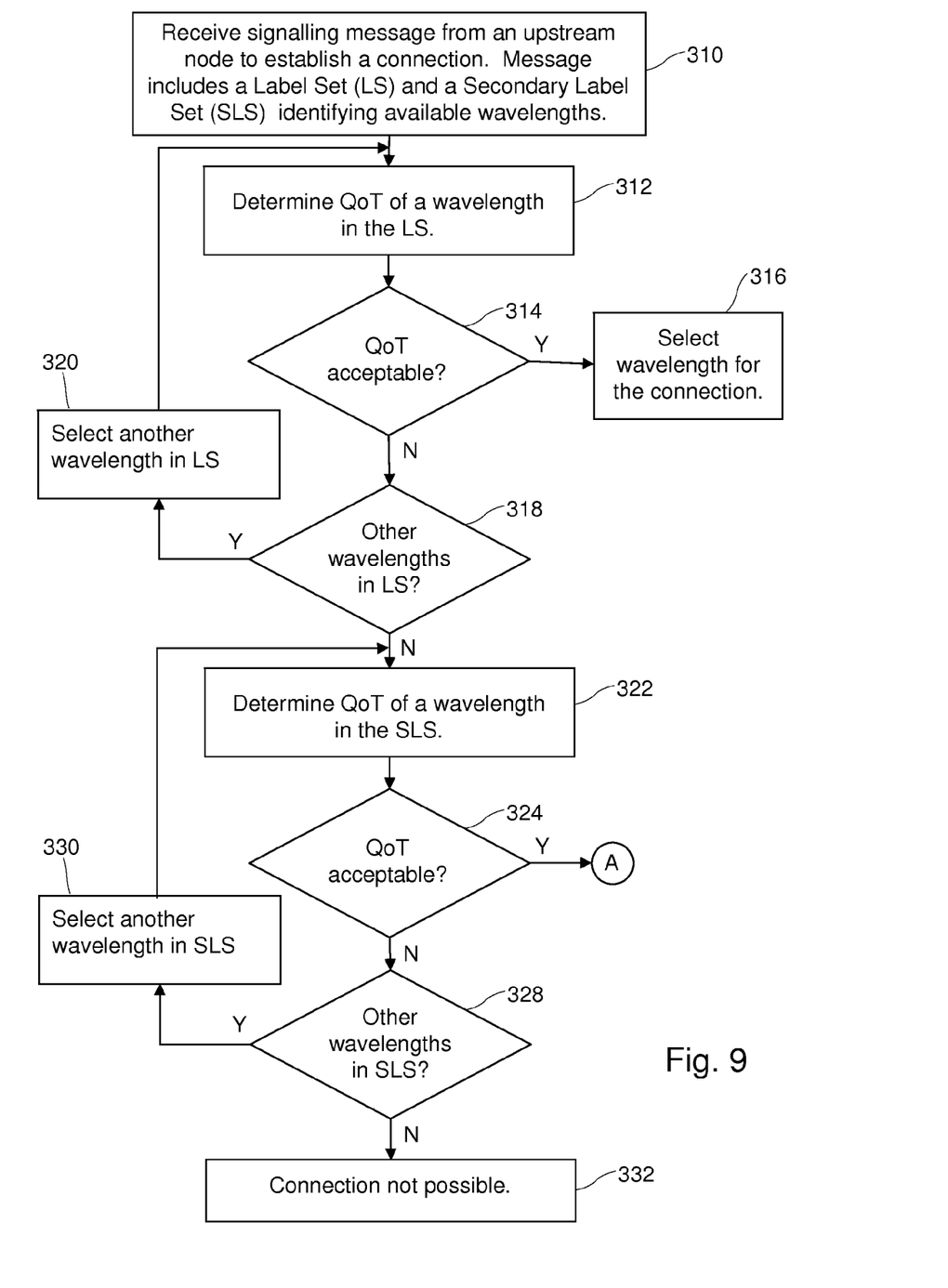
FIG. 9 show a method performed at a node to calculate a quality of transmission (QoT)
Figure 10:
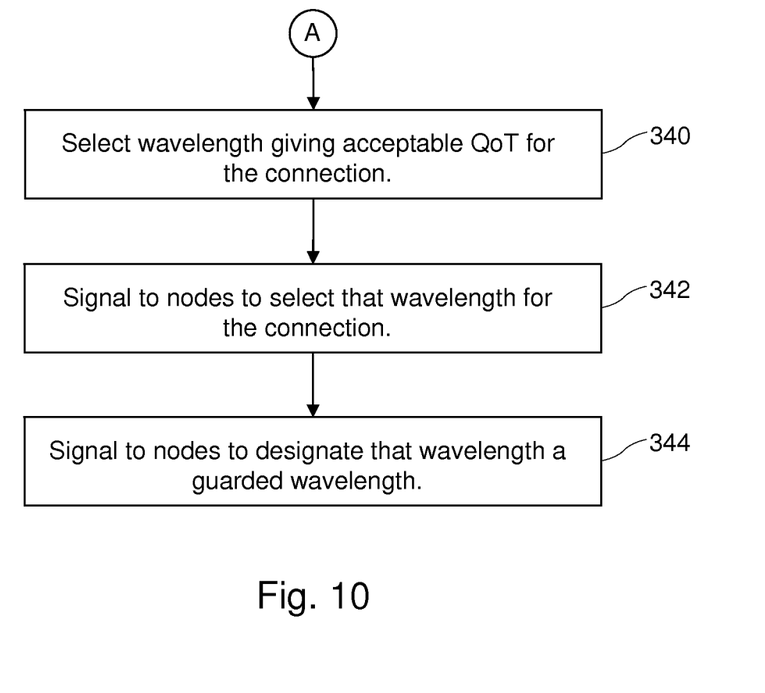
FIG. 10 shows additional steps of the method of FIG. 9 performed after finding a wavelength which offers an acceptable quality of transmission (QoT).

FIGS. 9 and 10 show a method performed at a destination node of a proposed connection. At step 310 the destination node receives a signalling message from an upstream node along the path of the proposed connection. The message includes a Label Set (LS) and a Secondary Label Set (SLS) identifying available wavelengths. At step 312 the destination node determines QoT at one of the wavelengths advertised in LS using a first QoT calculation which assumes worst-case conditions. Step 314 determines if the QoT meets a threshold representing an acceptable QoT. If the QoT is acceptable, the method selects that wavelength for the connection at step 316. If the QoT is not acceptable, the method proceeds to step 320 and selects another of the wavelengths advertised in the LS and returns to step 312. The calculation of QoT can use any suitable algorithm, and the determination of whether QoT is acceptable at step 314 assumes the worst-case condition, i.e. a set of 10G OOK signals occupying neighbouring lambdas. If none of the wavelengths advertised in the LS offers an acceptable QoT (steps 314, 318), the method proceeds to step 322. Step 322 determines QoT for one of the wavelengths advertised in SLS using a second QoT calculation. The determination at step 322 is less stringent than the QoT calculation used at step 312, as the wavelengths advertised in SLS are guarded from interfering lightpaths. Therefore, the calculation at step 322 does not need to consider XPM effects. If the QoT is acceptable, the method proceeds to "A" and the steps shown in FIG. 10. If the QoT is not acceptable, the method proceeds to step 330 and selects another of the wavelengths advertised in the SLS and returns to step 322. If none of the wavelengths advertised in the SLS offers an acceptable QoT (steps 324, 328), the method exits at step 332 and a connection cannot be set up.

FIG. 10 shows steps performed after finding a wavelength, advertised in SLS, which gives an acceptable QoT. At step 340, the node selects that wavelength for the connection. Step 342 signals to nodes along the path of the connection to select the wavelength. The signalling can be a RSVP-TE Resv message. At step 344, the node informs nodes along the path that the wavelength is to be treated as a guarded lightpath. This is because the wavelength was deemed acceptable at steps 322, 324 on condition that the wavelength is suitably guarded from lightpaths that can cause XPM. Step 324 can use a flag in the RSVP-TE message, e.g. set flag=1 to indicate "guarded" and set flag=0 to indicate "unguarded". In this way, each node receiving the Resv message also becomes aware of traversed guarded or unguarded lightpaths.

Referring again to FIG. 5, the connection established on $w_0$ and the connection established on $w_3$ share the same outgoing link 56. However, they follow different upstream paths (not shown) in the network. Thus, their QoT is different. The connection established on $w_0$ has a QoT such that, if worst-case scenario is considered, the lightpath has unacceptable QoT. If the guard band is used, XPM effects are negligible and the QoT is acceptable. Thus, the connection can only be established with a guard band and is called a guarded connection. The connection established on $w_3$ has acceptable QoT in the worst-case scenario and therefore does not need a guard band. This allows better wavelength usage.

Advantageously, connections carrying 10G and unguarded 100G traffic are allocated wavelengths at lower end of wavelength range ("first-fit"), and connections carrying guarded 100G traffic are allocated wavelengths at the upper end of the wavelength range ("last-fit"). This allows a better utilisation of wavelength resources as connections carrying guarded 100G traffic are grouped at neighbouring wavelengths, thus minimising usage of the guard band. This results in a reduced number of unused wavelengths.

The methods described above use a value of guard band (GB). The value of GB can be derived during network installation. Typically, GB is a conservative value, which is valid for each connection. The value of GB can be updated during the life of the network, as changes occur to the network.

The methods described above can be performed by module 60 at a node, as shown in FIG. 2, or by a plurality of separate modules which each perform at least one of the individual steps of the method.

It has been described how the methods of FIGS. 6 and 9 are performed at destination nodes. These methods can also be performed at an intermediate node along a path of a connection in a type of system which performs QoT calculations at intermediate nodes.

In the embodiments described above certain values of bitrate (10G, 100G) have been used as examples of the first bitrate traffic type and the second bitrate traffic type. It will be appreciated that the invention can be applied to other bitrates.

The methods described above can offer improved utilisation of the network resources across a range of traffic loads.

Appendix

This Appendix gives a detailed example of how to calculate the guard band. Firstly, only a 100G lightpath is considered. There will not be any XPM effects induced in this signal. BER for the signal is evaluated and called E. Then, the same 100G lightpath is considered with a 10G lightpath following the same network path and occupying the adjacent wavelength channel. In this case, XPM is experienced, and BER of the 100G lightpath is calculated (called $E_0$, where $E_0 > E$). Then, n free wavelengths are considered between the 10 and 100G lightpaths, and BER $E_n$ computed until $E_n = E$. GB is the $\max_{all\ paths}(n)$.

In the following calculation, a DP-QPSK 100G signal is considered. The signal is obtained by multiplexing two polarisations (i.e. 50G per polarisation). Coherent detection is assumed, with electronic post-processing at the receiver compensating for the effects of Polarisation Mode Dispersion and Chromatic Dispersion. Guard band and worst-case penalty can be found by computing BER, with the following equations:

$$BER(\rho, \sigma_{NL}^2) = \frac{3}{4} - \frac{\sqrt{\rho}}{\sqrt{\pi}} e^{-\rho/2} \sum_{m=1}^{\infty} \frac{\sin(m \cdot \pi/4)}{m} \cdot \left[ I_{\frac{m-1}{2}}(\rho/2) + I_{\frac{m+1}{2}}(\rho/2) \right] \cdot e^{-m^2 \cdot \sigma_{NL}^2/2}$$

where:
$I_k(x)$: ordered-k modified Bessel's function of the first kind
$\rho|_{dB} = OSNR|_{dB} + 10 \log 10(B/Rb) + 3$
$OSNR|_{dB}$: the OSNR of the 100 Gbit/s signal considering both polarizations
B=12.5 GHz
Rb=50 Gbit/s (because 100 Gbit/s bit-rate is split in two polarisations)
$\sigma_{NL}^2$, the variance of the non-linear phase noise, is given by the following contributions:

$$\sigma_{NL}^2 = \sigma_{SPM}^2 + \sigma_{XPM}^2$$

where $\sigma_{SPM}^2$ is contribution due to self phase modulation and $\sigma_{XPM}^2$ is contribution due to XPM):

$$\sigma_{XPM}^2 = \frac{8 \langle P \rangle^2 d \cdot \gamma^2}{T\alpha^3} \left( e^{T\alpha/2d} - 1 - \frac{T\alpha}{2d} \right)$$

where:
P: interfering OOK power
$\gamma$: Kerr's non-linear coefficient [3]
d: walk-off parameter [3]
T: OOK bit time
$\alpha$: attenuation coefficient Modifications and other embodiments of the disclosed invention will come to mind to one skilled in the art having the benefit of the teachings presented in the foregoing descriptions and the associated drawings. Therefore, it is to be understood that the invention is not to be limited to the specific embodiments disclosed and that modifications and other embodiments are intended to be included within the scope of this disclosure. Although specific terms may be employed herein, they are used in a generic and descriptive sense only and not for purposes of limitation.

The invention claimed is:

1. A method of establishing a connection of a second bitrate traffic type in an optical transmission network, the network comprising nodes connected by optical links, wherein the nodes support a plurality of different wavelength channels on the links and support at least a first bitrate traffic type and the second bitrate traffic type on respective wavelength channels, the method comprising, at one of the nodes:
receiving first information identifying wavelengths which are available on an upstream path to the node, wherein the node contains a wavelength selective switch (WSS) to switch wavelengths used for connections of the first and second bitrate traffic type and optical interfaces to connect other nodes;
receiving second information identifying wavelengths which are available on an upstream path to the node and which are spaced, by a guard band, from wavelengths used for connections of the first bitrate traffic type, the guard band being a wavelength spacing at which the interference between a connection of the first bitrate traffic type and a connection of the second bitrate traffic type is less than a predetermined amount;
determining a quality of transmission of a wavelength in the first information using a first quality of transmission calculation; and
if a result of the first quality of transmission calculation is not acceptable, determining a quality of transmission of an available wavelength in the second information using a second quality of transmission calculation, wherein the second quality of transmission calculation is less stringent than the first quality of transmission calculation.

2. A method according to claim 1 wherein the second quality of transmission calculation ignores the effect of interference caused by cross-phase modulation.

3. A method according to claim 1 wherein, if a result of the second quality of transmission calculation is satisfactory:
signalling to nodes to select that wavelength for the connection; and
signalling to nodes to designate that wavelength as a guarded wavelength.

4. A method according to claim 1 wherein the first information identifying wavelengths comprises a Label Set (LS) carried in a Resource Reservation Protocol-Traffic Engineering (RSVP-TE) message and the second information identifying wavelengths comprises a further Label Set carried in the Resource Reservation Protocol-Traffic Engineering (RSVP-TE) message, or a separate Resource Reservation Protocol-Traffic Engineering (RSVP-TE) message.

5. A method of establishing a connection of a second bitrate traffic type in an optical transmission network, the network comprising nodes connected by optical links, wherein the nodes support a plurality of different wavelength channels on the links and support at least a first bitrate traffic type and the second bitrate traffic type on respective wavelength channels, wherein an in-use wavelength can be guarded or unguarded, the method comprising, at one of the nodes:

determining available wavelengths on a downstream link from the node, wherein the node contains a wavelength selective switch (WSS) to switch wavelengths used for connections of the first and second bitrate traffic type and optical interfaces to connect other nodes;

determining available wavelengths on a downstream link from the node which are spaced, by a guard band, from wavelengths used for connections of the first bitrate traffic type, the guard band being a wavelength spacing at which the interference between a connection of the first traffic type and a connection of the second traffic type is less than a predetermined amount; and advertising the determined wavelengths to a downstream node.

6. A method according to claim 5 wherein the step of advertising the determined wavelengths comprises:

identifying the available wavelengths on the downstream link from the node in a Label Set (LS) carried in a Resource Reservation Protocol-Traffic Engineering (RSVP-TE) message; and identifying the available wavelengths on the downstream link from the node which are spaced, by a guard band, from wavelengths used for connections of the first bitrate traffic type as a further Label Set carried in the Resource Reservation Protocol-Traffic Engineering (RSVP-TE) message, or a separate Resource Reservation Protocol-Traffic Engineering (RSVP-TE) message.

7. A method of establishing a connection of a first bitrate traffic type in an optical transmission network, the network comprising nodes connected by optical links, wherein the nodes support a plurality of different wavelength channels on the links and support at least a first traffic type and the second traffic type on respective wavelength channels, the method comprising, at one of the nodes:

receiving information identifying wavelengths which are available on an upstream path to the node and which are spaced, by a guard band, from guarded in-use wavelengths used for a connection of the second bitrate traffic type, the guard band being a wavelength spacing at which the interference between a connection of the first traffic type and a connection of the second traffic type is less than a predetermined amount, wherein the node contains a wavelength selective switch (WSS) to switch wavelengths used for connections of the first and second bitrate traffic type and optical interfaces to connect other nodes; and determining a quality of transmission of a wavelength in the received information.

8. A method according to claim 7 wherein the information identifying wavelengths comprises a Label Set (LS) carried in a Resource Reservation Protocol-Traffic Engineering (RSVP-TE) message.

9. A method of establishing a connection of a first bitrate traffic type in an optical transmission network, the network comprising nodes connected by optical links, wherein the nodes support a plurality of different wavelength channels on the links and support at least the first traffic type and a second traffic type, wherein an in-use wavelength can be guarded or unguarded, the method comprising, at one of the nodes:

determining available wavelengths on a downstream link from the node which are spaced, by a guard band, from guarded in-use wavelengths used for connections of the second bitrate traffic type, the guard band being a wavelength spacing at which the interference between a connection of the first traffic type and a connection of the second traffic type is less than a predetermined amount, wherein the node contains a wavelength selective switch (WSS) to switch wavelengths used for connections of the first and second bitrate traffic type and optical interfaces to connect other nodes; and advertising the determined wavelengths to a downstream node.

10. A method according to claim 9 wherein the step of advertising the determined wavelengths comprises:

identifying the available wavelengths on the downstream link from the node in a Label Set (LS) carried in a Resource Reservation Protocol-Traffic Engineering (RSVP-TE) message.

11. A method according to claim 9 wherein the first bitrate traffic type is on-off key (OOK) modulated traffic at a first bitrate and the second bitrate traffic type is phase modulated traffic at a second bitrate, higher than the first bitrate.

12. A method according to claim 9 wherein the first bitrate traffic type is on-off key (OOK) modulated traffic at a bitrate of 10Gbit/s and the second bitrate traffic type is phase modulated traffic at a bitrate of 100Gbit/s.

13. An apparatus for use at a node of an optical transmission network, the network comprising nodes connected by optical links, wherein the nodes support a plurality of different wavelength channels on the links and support at least a first bitrate traffic type and the second bitrate traffic type on respective wavelength channels, the apparatus comprising:

a control module arranged to perform the following to establish a connection of a second bitrate traffic type, receive first information about wavelengths which are available on an upstream path to the node;

receive second information about wavelengths which are available on an upstream path to the node and which are spaced, by a guard band, from wavelengths used for connections of the first bitrate traffic type, the guard band being a wavelength spacing at which the interference between a connection of the first bitrate traffic type and a connection of the second bitrate traffic type is less than a predetermined amount;

determine a quality of transmission of a wavelength in the first information using a first quality of transmission calculation; and if a result of the first quality of transmission calculation is not acceptable, determine a quality of transmission of an available wavelength in the second information using a second quality of transmission calculation, wherein the second quality of transmission calculation is less stringent than the first quality of transmission calculation.

14. An apparatus for use at a node of an optical transmission network, the network comprising nodes connected by optical links, wherein the nodes support a plurality of different wavelength channels on the links and support at least a first bitrate traffic type and the second bitrate traffic type on respective wavelength channels, wherein an in-use wavelength can be guarded or unguarded, the apparatus comprising:

a control module arranged to perform the following to establish a connection of a second bitrate traffic type, determine available wavelengths on a downstream link from the node;

determine available wavelengths on a downstream link from the node which are spaced, by a guard band, from wavelengths used for connections of the first bitrate traffic type, the guard band being a wavelength spacing at which the interference between a connection of the first traffic type and a connection of the second traffic type is less than a predetermined amount; and advertise the determined wavelengths to a downstream node.

15. An apparatus for use at a node of an optical transmission network, the network comprising nodes connected by optical links, wherein the nodes support a plurality of different wavelength channels on the links and support at least a first traffic type and the second traffic type on respective wavelength channels, the apparatus comprising:

a control module arranged to perform the following to establish a connection of a first bitrate traffic type, receive information identifying wavelengths which are available on an upstream path to the node and which are spaced, by a guard band, from guarded in-use wavelengths used for a connection of the second bitrate traffic type, the guard band being a wavelength spacing at which the interference between a connection of the first traffic type and a connection of the second traffic type is less than a predetermined amount; and determine a quality of transmission of a wavelength in the received information.

16. An apparatus for use at a node of an optical transmission network, the network comprising nodes connected by optical links, wherein the nodes support a plurality of different wavelength channels on the links and support at least the first traffic type and a second traffic type, wherein an in-use wavelength can be guarded or unguarded, the apparatus comprising:

a control module arranged to perform the following to establish a connection of a first bitrate traffic type, determine available wavelengths on a downstream link from the node which are spaced, by a guard band, from guarded in-use wavelengths used for connections of the second bitrate traffic type, the guard band being a wavelength spacing at which the interference between a connection of the first traffic type and a connection of the second traffic type is less than a predetermined amount; and advertise the determined wavelengths to a downstream node.

* * * * *